United States Patent Office 3,705,834
Patented Dec. 12, 1972

3,705,834
CARPET WITH A FOAM POLYURETHANE BACKING
Claude E. Terry, Rockmart, Ga., assignor to Textile Rubber and Chemical Company, Inc., Dalton, Ga.
No Drawing. Continuation-in-part of application Ser. No. 111,860, Feb. 2, 1971. This application Feb. 3, 1971, Ser. No. 112,472
Int. Cl. D03d 27/00; D04h 11/00
U.S. Cl. 161—66                                    6 Claims

ABSTRACT OF THE DISCLOSURE

A tufted carpet is formed by application of a layer of thixotropic polyurethane adhesive backing composition to a primary backing material so that there is substantially complete saturation of the bundle wrap without penetration of the composition through the primary backing to the exposed portion of the tufted material. The polyurethane composition is prepared by mixing together under polymerization conditions water, a polyol with a hydroxyl number less than one hundred, a diisocyanate, a filler and a catalyst, and optionally a surfactant. The polyurethane obtained has a viscosity of between 30,000 and 100,000 cps. at 10 r.p.m. No. 7 spindle Brookfield RVF Viscometer, a pot life of between 20 to 60 seconds and is expandable from about 100 percent to about 400 percent when completely reacted. The polyurethane backing composition is applied to the underside of the primary backing with a doctor blade. Upon heating or allowing to stand at room temperature, the adhesive composition jells and expands. Subsequent to expansion and prior to curing, compressive pressure is applied to the expanded polyurethane backing composition to selectively disintegrate at least a portion of the foamed cells in the polyurethane and optionally form a pattern or design.

CROSS-REFERENCE TO RELATED APPLICATION

This application is a continuation-in-part of my copending application Ser. No. 111,860 filed Feb. 2, 1971.

This invention relates to a method of increasing the tuft lock of tufted carpets while providing requisite dimensional stability in the product obtained therefrom. More particularly, the persent invention concerns a method whereby a conventional woven secondary backing material is replaced by a thixotropic polyurethane adhesive backing composition which has sufficient strength and dimensional stability to lock the tufts of the carpet in the primary backing and provide necessary drape and stability requirements for the tufted carpet product.

Presently, the large majority of the world's carpets are produced by a tufting process whereby yarn is stitched through a primary backing so that a portion of the yarn, known as the bundle wrap, protrudes through the underside of the primary backing. After the stitching step a secondary backing, generally jute, is adhesively applied to the underside of the primary backing to cover the bundle wrap and provide dimensional stability and drape, while enhancing the tuft lock of the yarn, i.e., the strength with which the tufted yarn is retained by the primary backing. The adhesive used to laminate the secondary backing to the underside of the primary backing is of major importance to the quality and performance of the carpet. The adhesive must retain the tufted yarn in place, secure the individual fibers of the yarn in position, prevent piling of the yarn, control dimensional stability (handle or drape) and retain the secondary backing securely to the underside of the primary carpet. Also, it is extremely important that the adhesive not migrate through the primary backing and into the exposed portions of the tufting yarn. If such migration occurs, the yarn becomes stiff and the final carpet will be unacceptable.

Presently, a widely used adhesive system is based upon a latex or a carboxylated latex that is applied to the underside of the primary backing. The water in the latex system migrates through the primary backing into the exposed yarn, but the adhesive is retained by the primary backing and the bundle wrap. The latex adhesive is then cured after application and the final carpet is dried in large ovens at elevtaed temperatures. The curing and drying process is quite costly due to the large expense of the ovens, energy requirements, floor space requirements, and labor to operate the ovens. A second adhesive system known as the "hot-melt" system is based on the use of vinyl resins but it also is undesirable since the system requires the use of specially heated containers for transporting, storing, handling and applying the resin to the undersurface of the primary backing. In addition, these melted resins tend to migrate into the exposed yarn thereby producing unsatisfactory carpets.

The tuft lock of carpets produced with either latex adhesives or hot-melt vinyl adhesives is undesirably low and the tufted yarn can be pulled easily from the primary backing. The low tuft lock characteristic has necessitated laying conventional carpets in one or a few large pieces that conform to the shape of the surface being covered. It would be more desirable to use small rectangular sections of carpet to cover the same area but the risk of pulling the tufted yarn from the backing when using small sections of carpet would be increased substantially. If the tuft lock in carpets could be increased without reducing the hand and drape thereof, the carpet could be laid in small rectangular sections, thus reducing labor costs greatly.

It is an object of the present invention, therefore, to provide a tufted carpet with increased tuft lock and acceptable hand, drape and softness of exposed tufted yarn. Other objects, features and advantages of the present invention will become apparent from a review of the following detailed description.

In accordance with the present invention, there is provided a process for backing a tufted carpet with a layer of a thixotropic polyurethane adhesive composition. The polyurethane adhesive is a polymerization product of a mixture of a polyol having a hydroxyl number less than one hundred, water a polyisocyanate, a filler and a catalyst system that promotes a polymerization reaction between the isocyanate and the polyol to form a polyurethane within a short time after mixing. Penetration of the thixotropic polyurethane composition into the bundle wrap is controlled by regulating carefully its initial viscosity, its thixotropicity, its pot life and the amount of adhesive expansion during reaction so that the bundle wrap is at least 90 percent saturated with polyurethane adhesive without significant penetration through the primary backing and into the exposed portions of the tufted carpet yarn.

The thixotropic polyurethane composition is prepared by charging an aqueous polyol composition and a polyisocyanate composition separately to a mixing zone where the reactants are intimately mixed. Before a significant degree of polymerization and blowing occurs, the resultant mixture is evenly applied to the underside of the primary backing material by means of a doctor blade as the backing material moves under the doctor blade. The thixotropic nature of the polyurethane reaction product in combination with the shear forces created by application of the mixture with a doctor blade causes a sufficient reduction in the viscosity of the blend of reactants and product to promote spreading thereof. A polymerization reaction between the polyisocyanate, water and polyol is initiated when the reactants are mixed so that the reaction occurs both prior to and after the mixture-composition passes under the doctor blade. After passing the blade, the mixture-composition thickens due to its thixotropic nature so that migration of the composition into the tufted yarn on the upper side of the primary backing is prevented. The water in the composition besides promoting the polymerization also causes controlled foaming to improve adhesive migration into the bundle wrap before the composition is cured and reduces the amount of composition needed to attain desired adhesion.

When the foamed mixture-composition has jelled and completed or very nearly completed polymerization and blowing, but prior to curing, the foamed polyurethane adhesive is contacted with an embossed roll under pressure and the semi-cured adhesive is selectively crushed into the pattern of the roll. The crushing operation greatly decreases the cell concentration in areas determined by the pattern of the crushing roll. The pattern of the roll is designed so as to achieve nearly total crush in some areas while achieving only partial crush in other areas, i.e., selective crushing.

It would be highly desirable to employ a crushing roll with a pattern engraved thereon which is designed to leave an impression similar to the surface achieved when jute or other secondary backing is applied. It should be understood, however, that the crushing roll may have other desirable patterns and is not limited to a woven pattern.

By using the described urethane type adhesive including optionally a colorant to match the color of an accepted secondary back, and embossing said adhesive as above described with a roll in the pattern of the weave of the secondary backing material, it is possible to eliminate the secondary backing fabric altogether. The strength and stability of this adhesive is capable of producing acceptable yarn adhesion, dimensional stability and strength without the use of secondary woven backing materials.

The thixotropic polyurethane material must have a Brookfield viscosity of between about 30,000 and 100,000 cps. as measured at 10 r.p.m. #7 spindle on a Brookfield RVF viscometer to prevent migration thereof into the exposed yarn while permitting it to liquefy sufficiently under application of force and be spread by means of a doctor blade. The Brookfield viscometer and its operation is described in "Development of Research Technique for Evaluating the Low Temperature Fluidity of Automatic Transmission Fluids," published by Coordinating Research Council, Inc., February 1963, Appendix A, and designated as CRC L–45–1262. It has been found that migration cannot be prevented merely by increasing the viscosity of the composition but that it is necessary that the composition be thixotropic. In order to attain these characteristics, it is essential that the polyol employed have a hydroxyl number less than one hundred, preferably less than fifty. As is well known in the art, the hydroxyl number is defined as the number of milligrams of potassium hydroxide required for the complete neutralization of the hydrolysis product of the fully acetylated derivative prepared from one gram of polyether polyol. The hydroxyl number can also be defined by the equation:

$$OH = \frac{56.1 \times 1000 \times f}{MW}$$

wherein

OH = hydroxyl number of the polyol
$f$ = average functionality, i.e., the average number of hydroxyl groups per molecule of polyol
MW = average molecular weight of the polyol.

It is necessary that the polyol have a low hydroxyl number to reduce the concentration of the diisocyanate needed to effect complete reaction of the reactants to form the polyurethane. When employing liquid diisocyanates, increased amounts of diisocyanate reduce the viscosity and thixotropicity of the resultant composition below that desired to prevent migration of the composition into the exposed yarn. On the other hand, when a solid diisocyanate reactant is employed, increased amounts thereof will cause the resultant composition to be paste-like rendering it very difficult to spread. Accordingly, while low molecular weight polyols can be employed with solid diisocyanates and high molecular weight polyols can be employed with liquid diisocyanates, in each case the hydroxyl number of the polyol must be low to attain proper physical characteristics of the resultant composition. Accordingly, when employing solid diisocyanates reactants, the polyol should have a molecular weight between about 1000 and 3000 to attain the proper viscosity characteristics of the resultant composition. On the other hand, when the liquid diisocyanate reactant is employed, the polyol should have a molecular weight of between about 3000 and about 9000 to attain the desired viscosity characteristics of the resultant composition.

When the thixotropic polyurethane material is applied to the primary backing material, it is preferred that from 16 to 54 ounces of polyurethane material be applied per square yard of the backing material. It is also preferred that the polyurethane material have a foamed thickness of from ⅛ to ½ inch.

In one aspect of the present invention, a polyurethane prepolymer can be employed to replace or to be mixed with the polyol in the composition. These prepolymers are prepared by means well known in the art, i.e., by incomplete reaction of a polyol with a diisocyanate. The molecular weight of the prepolymer and the type of diisocyanate should be selected while bearing in mind the considerations described above.

While careful selection of the polyol or prepolymer and the diisocyanate provide a means for controlling the viscosity of the resultant composition, the composition cannot be made thixotropic to the desired degree by controlling the relative concentrations of only these two reactants. A suitable filler must be added in amounts sufficient to render the overall composition thixotropic to the desired degree but less than that which will cause the composition to become excessively viscous and paste-like. The concentration of filler is dependent upon the type of filler employed since the degree of thixotropicity varies with the filler used. Generally, the filler is employed in amounts of between about 15 and 300 parts per one hundred parts of polyol or prepolymer reactant. Representative suitable fillers include silica, asbestos, calcium carbonate, zinc oxide, clay, feldspar, or the like, or mixtures thereof. When fillers are employed, such as silica or calcium carbonate, it is preferred that additional fillers be added to attain the desired level of thixotropicity. It is preferred to employ asbestos powder as the filler either alone or in conjunction with another filler such as calcium carbonate as satisfactory thixotropic characteristics are achieved with asbestos and it additionally reduces the flammability of the composition.

The type of catalyst system employed in preparation of the thioxotropic polyurethane composition should regulate the pot life (i.e., the time for a 100 percent viscosity increase) thereof to between 10 and about 60 seconds at moderate temperatures of up to about 23° C. It is preferred that from .03 to one part of catalyst per one hundred parts of polyol be used in the reaction mixture.

It is necessary to employ a polyurethane composition that cures relatively quickly, otherwise the thixotropic composition will penetrate through the primary backing and into the exposed yarn prior to curing. Furthermore, it is not desirable to employ compositions which require the addition of heat to cure quickly since the application of heat will cause a viscosity reduction that exceeds the increase in viscosity due to curing thereby resulting in a net viscosity reduction and excessive penetration of the composition past the primary backing. It is preferred that curing be effected at a temperature of from room temperature to 275° F. and a corresponding cure period of 45 minutes to 1½ minutes.

Blowing or foaming the polyurethane composition is effected by controlling both the catalyst system and the water concentration. Generally, water is present in the reaction mass from between about .01 and .75 part per hundred parts polyol, over and above the water normally present as absorbed on the filler. The catalyst system not only must effect rapid curing but also must control formation of carbon dioxide resulting from the reaction of water and diisocyanate. Blowing should be controlled to effect adhesive expansion between about 100 percent and 400 percent, preferably between about 200 percent and 300 percent, so that the bundle wrap is saturated with adhesive and the adhesive is expanded sufficiently for selective crushing by a crushing roll prior to final curing. Suitable catalysts are those which promote polyurethane formation at a high rate but do not promote the blowing reaction in preference to the polyurethane reaction. Preferred catalysts are organic metal compounds, amines, and metal soaps; such catalysts include dibutyl tin dilaurate and stannous octoate.

Suitable polyols which can be employed in the present invention are the polyether polyols having a functionality of at least two, an average molecular weight between about 1000 and 9000 and a hydroxy number less than one hundred. Such polyols include polybutylene glycol, polyethylene glycol, polypropylene glycol, 1,2-polydimethylene glycol, polydecamethylene glycol and mixtures thereof. When using a liquid diisocyanate reactant, preferred polyols have an average molecular weight of between 4000 and 8000, and particularly preferred polyols have a molecular weight of between 6000 and 7000. When using a solid diisocyanate reactant, preferred polyols have an average molecular weight of between 1200 and 2800, and particularly preferred polyols have a molecular weight of between 1500 and 2500.

A variety of polyisocyanates may be reacted with these polyols to obtain satisfactory polyurethane adhesives. Particularly suitable polyisocyanates are aromatic diisocyanates as they are more reactive and less toxic than the aliphatic diisocyanates. Such diisocyanates include 2,4-toluene diisocyanate, 2,6-toluene diisocyanate, methane dissocyanate, naphthylene 1,4-diisocyanate, diphenylmethane-4,4'-diisocyanate, 3,3'-dimethoxy biphenylene diisocyanate, 4,4-diphenylene diisocyanate and mixtures thereof. The diisocyanate usually is employed in stoichiometric excess to assure complete reaction with the functional groups of the polyol and with the water which is present. Preferably from 18 to 50 parts of diisocyanate per one hundred parts of polyol are used in the reaction mass.

Another method of preparation of the polyurethane adhesive is possible and practical. By addition of from one to three parts of selected surfactants or surface additive agents per one hundred parts of polyol rather than water, it is possible to mechanically froth or entrain air into the polyurethane compound rather than chemically foam the compound and produce a stable froth of air and polyurethane adhesive.

A general formulation for preparation of said adhesive is:

| Material: | Parts |
| --- | --- |
| Polyol or (other hydroxyl containing material) | 100.00 |
| Asbestos | 10.00 |
| Dibutyl tin dilaurate | .06 |
| Surfactant | 3.00 |
| Colorant | .50 |
| Dissocyanate | 30.00 |

The froth of the above formulation is applied by suitable doctoring means to the underside of the primary backing of a carpet in a desired thickness of from 1/16 to ½ inch, jelled and then crushed with an embossed roll to achieve the desired pattern. Suitable surfactants include silicon surfactant compounds from Union Carbide Company and Dow Chemical Company.

Example I

To a mixing head apparatus adapted to spread a mixture onto the underside of the primary backing material of a moving carpet are separately charged (1) 100.0 pounds of polypropylene glycol having a hydroxyl number of about twenty-five and a molecular weight of 6500; 0.50 pound of water; 15.0 pounds of asbestos powder having an average particle size of about 5–50 microns; 100.0 pounds of calcium carbonate having an average particle size of about 50–150 microns; and 0.05 pound of dibutyl tin dilaurate and (2) 30 pounds of modified diphenylmethane-4,4-diisocyanate (supplied by the Upjohn Company and identified as Isonate 143L). The resultant mixture has an initial viscosity of about 88,000 when measured on a Brookfield viscometer with spindle No. 7 at 10 r.p.m., RVF. A primary backing material, through which nylon yarn has been tufted, is then fed under the mixing head. The thixotropic polyurethane mixture is applied to the primary backing and bundle wrap at a rate of 18 ounces of mixture per square yard of backing by means of a doctor blade and allowed to foam to a general thickness of approximately ¼ inch and jell while heat is applied at a temperature of about 135° C. Just after jellation, the primary backing and foamed adhesive are passed between a smooth roller and a pattern roller where the foam is selectively crushed under a pressure of eight pounds p.s.i. into a pattern of woven fabric. The resultant fabric is then passed under a heat source and over a series of heated rolls maintained at about 135° C. to complete the cure of the foam and then rolled on a storage roll.

Example II

The following general formulation,

| Material: | Pounds |
| --- | --- |
| Triol polyethylene glycol (M.W. 6,000) | 100.00 |
| Asbestos | 10.00 |
| Filler (calcium carbonate) | 75.00 |
| Dibutyl tin dilaurate | 0.03 |
| Colorant | .05 |
| Silicon surfactant (Dow Chemical Company) | 3.00 |
| A diisocyanate prepolymer of the diisocyanate of Example I and polypropylene glycol; the prepolymer provides a free NCO percentage of approximately 34% with an isocyanate equivalent of approximately 140 | 30.00 | is metered and blended with dry air in the head of a mechanical frothing machine, such as is conventionally employed to froth latex, candies, and food products. The agitation produced in the frothing head produces an adhesive-air froth of approximately 17 pounds per cubic foot density. This froth is poured into a puddle behind a doctoring blade which meters approximately 38 ounces per square yard at about ⅜ inch thick onto the carpet backing. The adhesive compound is jelled and crushed and cured as described in Example I.

While this invention has been described in detail with particular reference to preferred embodiments thereof, it will be understood that variations and modifications can be effected within the spirit and scope of the invention as described hereinbefore and as defined in the appended claims.

I claim:
1. Tufted carpet including a primary backing material, loops of tufted yarn stitched through the primary backing to provide a pile surface on one side of the primary backing and a bundle wrap of yarn on the underside of the primary backing; and a layer of compressed foamed thixotropic polyurethane material adhered to the underside of the primary backing and the bundle wrap of yarn, said polyurethane material being prepared from a mixture of water, a polyol having a hydroxyl number of less than one hundred and a functionality of at least two, said polyol being selected from the group consisting of polybutylene glycol, polyethylene glycol, 1,2-polydimethylene glycol, polydecamethylene glycol, and mixtures thereof; an aromatic diisocyanate selected from the group consisting of 2,4-toluene diisocyanate, 2,6-toluene diisocyanate, methane diisocyanate, naphthylene 1,4-diisocyanate, diphenylmethane - 1,4' - diisocyanate, 3,3'-dimethoxy biphenylene diisocyanate, 4,4-diphenylene diisocyanate, and mixtures thereof; a filler selected from the group consisting of silica, asbestos, calcium carbonate, zinc oxide, feldspar, clay and mixtures thereof; and a polyurethane catalyst; said thixotropic polyurethane reaction product having a viscosity of between about 30,000 and 100,000 as measured on spindle No. 7 at 10 r.p.m. of a Brookfield RVF viscometer and a pot life of between 10 and 60 seconds.

2. Tufted carpet of claim 1 wherein a solid aromatic diisocyanate reactant is employed and the polyol has an average molecular weight of between about 3000 and 9000.

3. Tufted carpet of claim 1 wherein a liquid aromatic diisocyanate reactant is employed and the polyol has an average molecular weight of between about 3000 to about 9000.

4. Tufted carpet of claim 1 wherein the filler is present in the mixture in an amount of between about 15 and 300 parts per one hundred parts of polyol; water is present in the mixture in an amount of between about .01 and .75 part per hundred parts of polyol; a metal compound polyurethane catalyst is present in the mixture in an amount of between about .03 and 1 part per hundred parts of polyol; and the polyisocyanate is present in the mixture in an amount of between about 18 and 50 parts per hundred parts of polyol.

5. Tufted carpet of claim 1 wherein a surfactant is included in the reaction mixture in an amount of between about one and three parts per one hundred parts of polyol.

6. Thixotropic polyurethane adhesive material comprising the reaction product of water, a polyol having a hydroxyl number of less than one hundred and functionality of at least two, an aromatic diisocyanate; asbestos; and a metal compound polyurethane catalyst; said reaction product having a viscosity of between about 30,000 and 100,000 as measured on spindle No. 7 at 10 r.p.m. of a Brookfield RVF viscometer and a pot life of between 10 and 60 seconds.

References Cited
UNITED STATES PATENTS

| | | | |
|---|---|---|---|
| 3,150,109 | 9/1964 | Ferrigno | 260—2.5 |
| 3,513,046 | 5/1970 | Westfield | 156—72 |
| 3,519,526 | 7/1970 | Carey et al. | 156—79 X |
| 3,598,772 | 8/1971 | Hood et al. | 260—2.5 |

WILLIAM A. POWELL, Primary Examiner

U.S. Cl. X.R.

156—72, 79, 327; 161—67, 166, 190; 260—2.5, 37